United States Patent [19]
Lee et al.

[11] 4,040,298
[45] Aug. 9, 1977

[54] GEARLESS PRESSURE OR TEMPERATURE GAUGE

[76] Inventors: Char-Shin Lee; Hsug-Fang Wang, both of No. 361 Sec. 1 Wanshou Road, Kueishan Hsiang, Taoyuan Hsien, China /Taiwan

[21] Appl. No.: 674,891

[22] Filed: Apr. 8, 1976

[51] Int. Cl.² ............................ G01L 7/08; G01K 5/32
[52] U.S. Cl. ..................................... 73/406; 73/368.3
[58] Field of Search .................. 73/406, 407 R, 408, 73/146.8, 410, 419, 368.3, 368.7, 411

[56] References Cited
U.S. PATENT DOCUMENTS

| | | | |
|---|---|---|---|
| 1,291,901 | 1/1919 | Hurd | 73/146.8 |
| 3,523,451 | 8/1970 | Kohn | 73/406 |

*Primary Examiner*—Donald O. Woodiel

[57] ABSTRACT

A pressure gauge comprising a diaphragm, a cylinder seat, and a driving helix movable up or down to constitute the operating elements. A rotary shaft with a pin fixed thereon rotates clockwise or counterclockwise responsive to the movement of the diaphragm. The rotary shaft will return to its initial position when the pressure on the diaphragm is removed by the restoring force of a helical spring.

7 Claims, 5 Drawing Figures

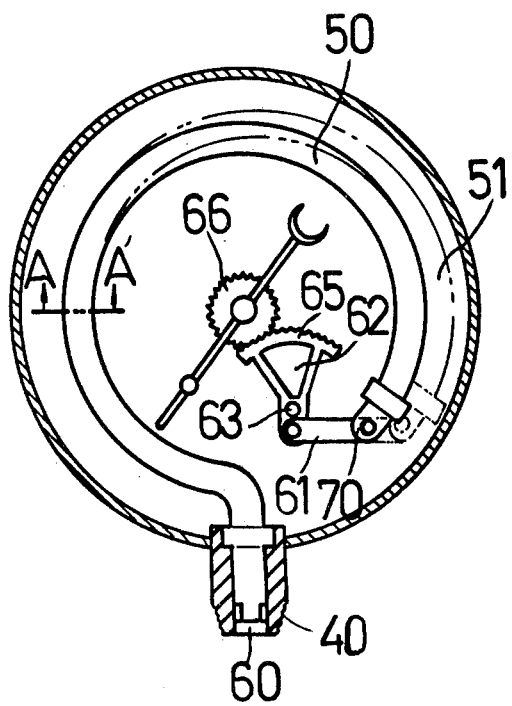
Fig. 1 (PRIOR ART)
A-A' SECTION
Fig. 2 (PRIOR ART)
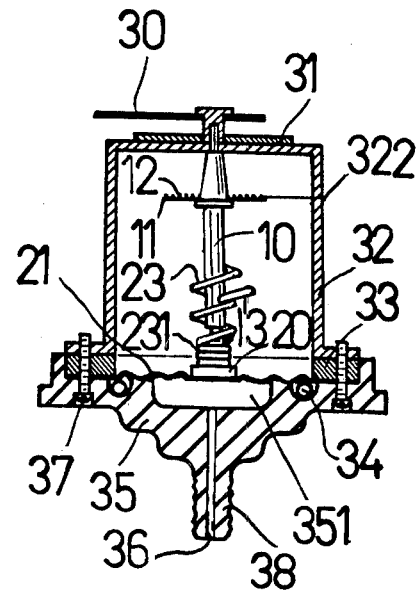
Fig. 3
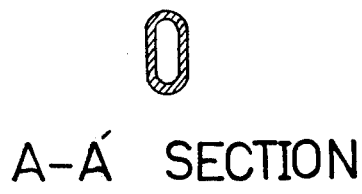
Fig. 5

GEARLESS PRESSURE OR TEMPERATURE GAUGE

BACKGROUND OF THE INVENTION

1. Field of the Invention

This invention relates to a gearless pressure or temperature gauge.

2. Brief Description of the Prior Art

A conventional pressure gauge is constructed using a Bourdon tube as the operating element. Referring to FIG. 1, the internal construction of a pressure gauge is shown. Adapter 40 is usually sized to fit a ⅛ in. pipe thread. Restricter 60 is of conventional design.

A pressure rise in Bourdon tube 50 will cause it to tend to straighten out to the position 51. The A—A' section view of Bourdon tube is shown in FIG. 2. This movement will pull on the link 61, which will turn the sector gear 62 counterclockwise about pivot pin 63, and the pointer shaft gear 66 will then turn clockwise to move the needle 67.

The Bourdon tube, usually made of soft copper material, welded to the adapter fitting 70, has to endure the pressure change with high sensitivity. This will limit the accuracy of pressure measurement. Further, if used for a long time, the elasticity of the Bourdon tube will be diminished. Finally, the tube may be easily destroyed by abuses and sharp pressure fluctuations.

In another aspect, many gears are used as operating elements in prior art devices, thereby making the pressure measurements subject to play resulting in a certain deviaton of the reading. Such gauges must be checked from time to time over their full range or scale, and this is quite inconvenient for a user.

In yet another aspect, the many gears, shafts etc. used in the manufacturing process are very complex. Thus, the price of the gauge is accordingly high.

BRIEF SUMMARY OF THE INVENTION

The object of the present invention is to obviate the disadvantage stated hereabove by providing a novel, gearless pressure or temperature gauge wherein a diaphragm is used for a basic operating element without the worry of being destroyed by abuses and sharp pressure fluctuations. Further, with only few mechanical elements being used, the manufacturing process will be simplified, and the gauge price can be lowered. Furthermore, and most importantly, the measurement deviation of the gauge will be substantially decreased with the use of gearless operating elements, resulting in increased accuracy. Still further, the present invention can be used as a pressure gauge or a temperature gauge.

BRIEF DESCRIPTION OF THE DRAWINGS

The object, advantages and function of the present invention will be made apparent from the following detailed description of the preferred embodiment with reference to the accompanying drawings where:

FIG. 1 is a perspective view of the internal construction according to a conventional pressure gauge.

FIG. 2 is a sectional view of the Bourdon tube according to the conventional pressure gauge of FIG. 1.

FIG. 3 is a vertical cross-sectional view of the internal construction of the gauge according to the present invention.

FIG. 5 is a vertical sectional view of the diaphragm, the cylinder seat, and the driving helix, to show their interconnection.

DETAILED DESCRIPTION OF THE PREFERRED EMBODIMENTS

Figure 4:
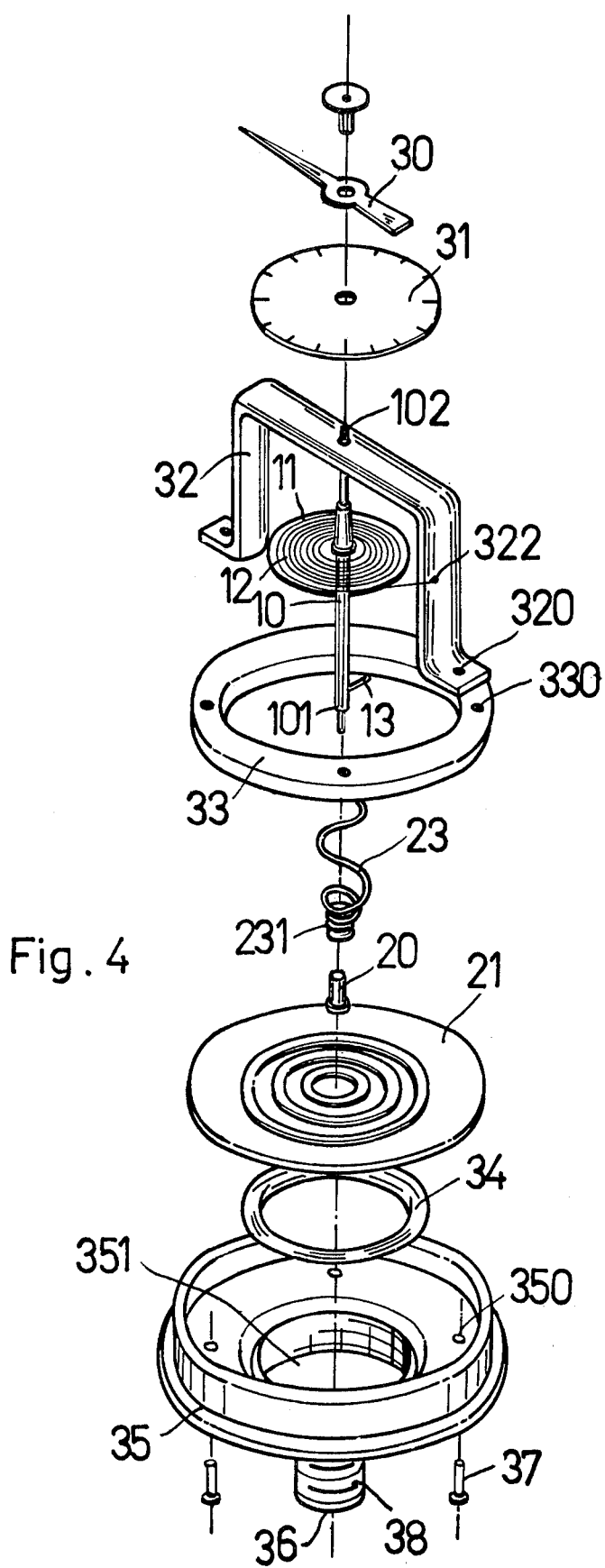
FIG. 4 is a blown-up perspective view of all the parts of the gauge according to the present invention.

Referring to FIG. 4 from top to bottom, a needle 30 is mounted on rotary shaft 10 at end 102; the dial 31 is fixed on the frame 32; a spiral spring 12 is situated in a fixing frame 11 with its one end fixed to a proper point 322 of the frame 32 and its other end fixed to shaft 10; pin 13 of the rotary shaft 10 lays loosely on the driving helix 23; the cylindrical seat 20 with the driving helix 23 fixed thereon is mounted on the diaphragm 21; and the wave diaphragm 21 is sealed to the case 35 together with bush 33 and oil seal ring 34.

For pressure measurement, the fluid is guided from restrictor 36 into the chamber 351 of the case 35. A pressure above (or below) atmospheric pressure will cause the diaphragm to become convex (concave). The cylindrical seat 20 as well as driving helix 23 will then be forced upward (or downward). The rotary shaft 10, due to its pin 13 laying on the driving helix 23, will be forced to rotate clockwise (or counterclockwise); and the needle will follow such shaft movement. Meanwhile, the rotation of rotary shaft 10 causes the spiral spring 12 to store a restoring energy in the counterclockwise (or clockwise) direction. The user can easily read out the pressure value from the properly calibrated scale on the dial.

Once the pressure is released, the diaphragm will become flat again due to its own elasticity. The pin of the rotary shaft will leave the driving helix because of the downgoing (or upgoing) of the driving helix following the diaphragm. Finally, the rotary shaft will rotate to its initial position due to the restoring force of the spiral spring 12.

For temperature measurement, the chamber 351 is sealed and filled with a certain kind of sensitive fluid as shown in FIG. 3. When a heat source is connected to the adaptor 38, the liquid will expand due to thermal expansion, or diminish by cooling, making the diaphragm become convex or concave. Following the procedures like pressure measurement, with properly calibrating the scale on the dial, the user can read out the temperature value easily.

What we claim is:

1. A gearless pressure gauge comprising:
   a. a housing having a sealed chamber;
   b. a diaphragm flexing in response to a change in pressure in said chamber;
   c. a cylindrical seat carrying a driving helix mounted thereon and fixed to said diaphragm;
   d. a rotary shaft with a transverse pin fixed thereon, said shaft adapted to rotate in accordance with the reciprocation of the driving helix due to diaphragm movement under pressure, with said pin being forced to rotate said shaft under the influence of a caming action with said driving helix;
   e. a spiral spring providing a restoring force making the rotary shaft rotate to its initial position upon relaxing of said diaphragm; and
   f. indicating means connected to said rotary shaft and influenced by the rotation of said rotary shaft for causing a readout proportional to the pressure in said chamber.

2. A pressure gauge according to claim 1, including a frame for said spiral spring, said rotary shaft being supported by suspension in said spiral spring frame, said pin of said shaft being biased against said driving helix by the restoring force of said spiral spring.

3. A pressure gauge according to claim 1, wherein said driving helix mounted on said cylindrical seat has a uniform pitch end-to-end.

4. A pressure gauge according to claim 1, wherein said driving helix has a non-uniform pitch end-to-end.

5. A pressure gauge according to claim 1, wherein the upper part of said driving helix, remote from said cylindrical seat, is used for driving said rotary shaft.

6. A gearless pressure gauge according to claim 1, wherein said cylindrical seat is used for supporting the bottom end of said rotary shaft.

7. A gearless pressure gauge according to claim 1, wherein said chamber is filled with a fluid, and the pressure changes in said chamber result from changes in temperature of said fluid, and the readout caused by said indicating means is proportional to said temperature.

* * * * *